United States Patent
Yang et al.

(10) Patent No.: US 8,825,243 B2
(45) Date of Patent: Sep. 2, 2014

(54) PREDICTIVE ENERGY MANAGEMENT CONTROL SCHEME FOR A VEHICLE INCLUDING A HYBRID POWERTRAIN SYSTEM

(75) Inventors: Hong Yang, Rochester Hills, MI (US); Joel M. Maguire, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 764 days.

(21) Appl. No.: 12/560,604

(22) Filed: Sep. 16, 2009

(65) Prior Publication Data

US 2011/0066308 A1 Mar. 17, 2011

(51) Int. Cl.
 *B60W 10/26* (2006.01)
 *G06F 17/00* (2006.01)
 *G06F 19/00* (2011.01)

(52) U.S. Cl.
 USPC ............. 701/22; 701/411; 701/412; 701/423; 701/439; 340/995.13; 340/995.27; 180/65.29

(58) Field of Classification Search
 USPC ............... 701/1, 36, 70, 93, 94, 99, 117, 123, 701/29.1, 39.1, 32.1, 32.3, 33.4, 34.4, 400, 701/408, 409, 410, 411, 414, 423, 424, 425, 701/431, 439, 454, 458–460, 532, 300; 340/988, 995.1, 995.13, 995.14, 340/995.27; 180/65.21, 65.22, 65.225, 180/65.28, 65.285, 65.29, 65.31; 903/902, 903/905, 906, 907

See application file for complete search history.

(56) References Cited

U.S. PATENT DOCUMENTS

| | | | |
|---|---|---|---|
| 7,967,720 B2 * | 6/2011 | Martin et al. | 477/3 |
| 2008/0270016 A1 * | 10/2008 | Proietty et al. | 701/123 |

FOREIGN PATENT DOCUMENTS

JP 2003-320307 A 11/2003

OTHER PUBLICATIONS

Salman, S.; Predictive Energy Management Strategies for Hybrid Vehicles; IEEE; 2005; 0-7803-9280-9/05.

* cited by examiner

*Primary Examiner* — Thomas Tarcza
*Assistant Examiner* — Edward Pipala

(57) ABSTRACT

A method for controlling a vehicle having a hybrid powertrain includes monitoring vehicle navigation and traffic patterns associated with a predicted travel path. It extends the powertrain instantaneous controller into a predictive control framework, and utilizes previewed traffic and geographic information based on on-board sensing and navigation information. An impending road load is predicted from which a fuel cost factor is optimized under a model predictive control framework. A state-of-charge trajectory is predicted from the impending road load and operation of the hybrid powertrain system is controlled in response thereto.

19 Claims, 5 Drawing Sheets

PREDICTIVE ENERGY MANAGEMENT CONTROL SCHEME FOR A VEHICLE INCLUDING A HYBRID POWERTRAIN SYSTEM

TECHNICAL FIELD

This disclosure pertains to control systems for vehicles incorporating hybrid powertrain systems.

BACKGROUND

The statements in this section merely provide background information related to the present disclosure and may not constitute prior art.

Known hybrid powertrain architectures include torque-generative devices including internal combustion engines and torque machines that can be mechanically coupled to a transmission device to transfer torque to an output member. Known torque machines transform stored energy to power to generate torque. One known hybrid powertrain system includes an internal combustion engine coupled to an input member of a two-mode, compound-split, electro-mechanical transmission having an output member operatively coupled to a driveline of a motor vehicle for transferring tractive torque thereto. Torque machines including electric machines operative as motors or generators can generate torque inputs to the transmission, independently of a torque input from the internal combustion engine. The electric machines may transform vehicle kinetic energy transferred through the vehicle driveline to electrical energy that is storable in an electrical energy storage device. A control system monitors various inputs from the vehicle and the operator and provides operational control of the hybrid powertrain, including controlling transmission range state and gear shifting, controlling the torque-generative devices, and regulating the electrical power interchange among the electrical energy storage device and the electric machines to manage outputs of the transmission, including torque and rotational speed.

Known control strategies for operating a hybrid powertrain system including executing power management schemes to achieve preferred targets associated with fuel consumption, emissions, and stored energy usage responsive to an operator request for output torque. Known power management schemes for controlling operation of hybrid powertrain systems monitor present conditions and generate instantaneous control signals to control actuators of the powertrain system.

Known vehicle systems include global position sensors (GPS) and digital mapping systems to monitor vehicle position and movement relative to a highway system.

SUMMARY

A vehicle is equipped with a hybrid powertrain system which includes an internal combustion engine operatively coupled to an input member of a hybrid transmission having a torque machine operative to exchange power with an energy storage device. The hybrid transmission is configured to transfer torque among the input member, the torque machine and an output member. A method for operating the vehicle includes monitoring vehicle navigation and traffic patterns associated with a predicted travel path for the vehicle, predicting an impending road load associated with the vehicle navigation and traffic patterns, estimating vehicle propulsion power associated with the predicted impending road load, determining a desired state-of-charge trajectory for the energy storage device, predicting a state-of-charge trajectory for the energy storage device corresponding to the estimated vehicle propulsion power and the desired state-of-charge trajectory for the energy storage device, and controlling operation of the hybrid powertrain system in response to the predicted state-of-charge trajectory for the energy storage device.

BRIEF DESCRIPTION OF THE DRAWINGS

One or more embodiments will now be described, by way of example, with reference to the accompanying drawings, in which.

DETAILED DESCRIPTION

Figure 1:
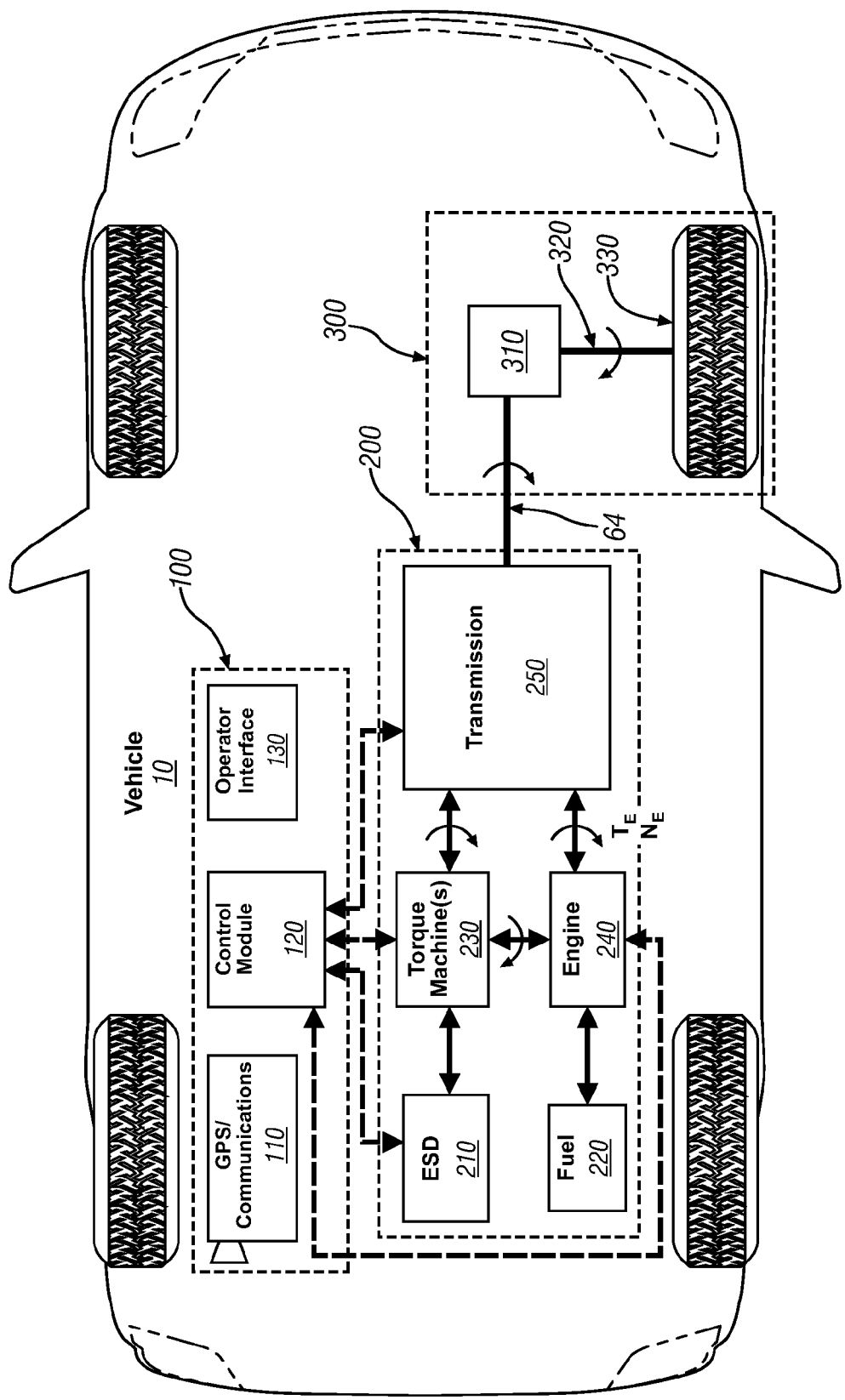
FIG. 1 is a schematic diagram of an exemplary hybrid powertrain in accordance with the present disclosure.

Referring now to the drawings, wherein the showings are for the purpose of illustrating certain exemplary embodiments only and not for the purpose of limiting the same, FIG. 1 schematically shows a vehicle 10 including a control system 100, a hybrid powertrain system 200, and a driveline 300.

The driveline 300 can include a differential gear device(s) 310 that mechanically couples to an axle(s) 320 or a half-shaft(s) that mechanically couples to a wheel(s) 330 in one embodiment. The differential gear device 310 is coupled to an output member 64 of the hybrid powertrain system 200. The driveline 300 transfers tractive power between the hybrid transmission 250 and a road surface via the wheel(s) 330.

The hybrid powertrain system 200 includes an energy storage device (ESD) 210 that stores potential energy and is coupled to one or more torque machine(s) 230 to transfer power therebetween. When the ESD 210 includes an electrical storage device and the torque machine(s) 230 include electric motor/generators, controllable power inverter(s) can be placed therebetween and used to transform electric power. The torque machine(s) 230 are operative to convert stored energy to mechanical power and operative to convert mechanical power to energy that can be stored in the ESD 210. The engine 240 is operative to convert fuel stored in a fuel tank 220 to mechanical power. Mechanical power from the engine 240 can be transferred to the hybrid transmission 250 and the torque machine(s) 230. Mechanical power from the torque machine(s) 230 can be transferred to the hybrid transmission 250 and the engine 240. Mechanical power from the hybrid transmission 250 can be transferred to the engine 240, the torque machine(s) 230 and the driveline 300 via the output member 64. The transferred mechanical power can be in the form of tractive torque for vehicle propulsion, and in the form of reactive torque for vehicle braking associated with regenerative braking functionality.

Preferably, the engine 240 is selectively operative in a plurality of states, including one of an engine-on state and an engine-off state, one of an all-cylinder state and a cylinder deactivation state, and one of a fueled state and a fuel cutoff state. Preferably, the hybrid transmission 250 is selectively operative in one of a plurality of range states including fixed gear and continuously variable range states. The torque machine(s) 230, engine 240 and hybrid transmission 250 each include a plurality of sensing devices for monitoring operation thereof and actuators for controlling operation thereof.

Alternatively, the hybrid powertrain system is associated with an electric vehicle, including an electric vehicle having extended range capability. The hybrid powertrain system includes the torque machine(s) 230 that transforms energy stored in the energy storage device (ESD) 210 to mechanical torque for vehicle propulsion via the driveline 300, including tractive torque for vehicle propulsion and reactive torque associated with regenerative braking. One torque machine(s) 230 operatively connects to the internal combustion engine 240 to transform mechanical torque to potential energy storable in the energy storage device (ESD) 210.

The control system 100 includes a control module 120 that is signally connected to an operator interface 130 and signally connected to a GPS/communications system 110. The GPS/communications system 110 preferably includes extra-vehicle communications capability and a three-dimensional (3-D) Geographic Information Service (GIS) digital map system to provide elevation information for a traffic route associated with a predicted travel path for the vehicle 10. The GPS/communications system 110 may include on-vehicle inertial measurement sensors, infrared sensing devices, radar, lidar and other monitoring systems, none of which are shown, to monitor and evaluate instantaneous localized vehicle traffic patterns. The operator interface 130 includes a plurality of human/machine interface devices through which the vehicle operator commands operation of the vehicle 10, including an accelerator pedal, a brake pedal, and a transmission range selector (PRNDL.

The vehicle operator communicates an output torque command including an operator torque request, a direction of vehicle travel, i.e., forward or reverse, and a preferred range state for the hybrid transmission 250 through the accelerator pedal, the brake pedal, and the transmission range selector. The operator interface 130 can further include an interface to an on-board navigation system that interacts with the GPS/communications system 110.

The control module 120 is signally connected to the sensing devices of each of the torque machine(s) 230, the engine 220, the hybrid transmission 250, and the ESD 210 to monitor operation and determine parametric states thereof. Monitored states of the ESD 210 preferably include instantaneous current flow and temperature when the ESD 210 includes an electrical energy storage device. The control module 120 calculates a parametric state of the ESD 210 indicative of the capacity of the ESD 210 to transfer power to the torque machine(s) 230. The parametric state of the ESD 210 includes a state-of-charge (SOC) when the ESD 210 is an electrical energy storage device. Monitored states of the engine 220 preferably include engine speed ($N_E$), output torque ($T_E$) or load, and temperature. Monitored states of the hybrid transmission 250 preferably include rotational speed, and hydraulic pressure at a plurality of locations, from which parametric states including application of specific torque transfer clutches can be determined Monitored states of the torque machine(s) 230 preferably include speed(s) and power flow(s), e.g., electric current flow, from which a parametric state for output motor torque(s) from the torque machine(s) 230 can be determined.

The control module 120 is operatively connected to the actuators of each of the torque machine(s) 230, the engine 220, and the hybrid transmission 250 to control operation thereof in accordance with executed control schemes that are stored in the form of algorithms and calibrations. The actuators associated with the torque machine(s) 230 preferably include inverter modules. The actuators associated with the engine 220 preferably include, e.g., fuel injectors, air flow controllers, spark ignition systems, and other known devices associated with controlling engine operation including controlling engine states. The actuators associated with the hybrid transmission include solenoid devices for actuating torque transfer clutches to effect operation in specific range states.

The control module 120 preferably includes one or more general-purpose digital computers, each including a microprocessor or central processing unit, storage mediums including read only memory (ROM), random access memory (RAM), electrically programmable read only memory (EPROM), a high speed clock, analog to digital (A/D) and digital to analog (D/A) circuitry, and input/output circuitry and devices (I/O) and appropriate signal conditioning and buffer circuitry. The control module 120 has a set of control algorithms, including resident program instructions and calibrations stored in one of the storage mediums and executed to provide desired functions. Information transfer to and from the control module 120 can be accomplished by way of a direct connection, a local area network bus and a serial peripheral interface bus. The algorithms of the control schemes are executed during preset loop cycles such that each algorithm is executed at least once each loop cycle. Algorithms stored in the non-volatile memory devices are executed by the central processing unit to monitor inputs from the sensing devices and execute control and diagnostic routines to control operation of actuators associated with elements of the hybrid powertrain 200 using calibrations. Loop cycles are executed at regular intervals, for example each 3.125, 6.25, 12.5, 25 and 100 milliseconds during ongoing operation of the hybrid powertrain. Alternatively, algorithms may be executed in response to the occurrence of an event.

Figure 2:
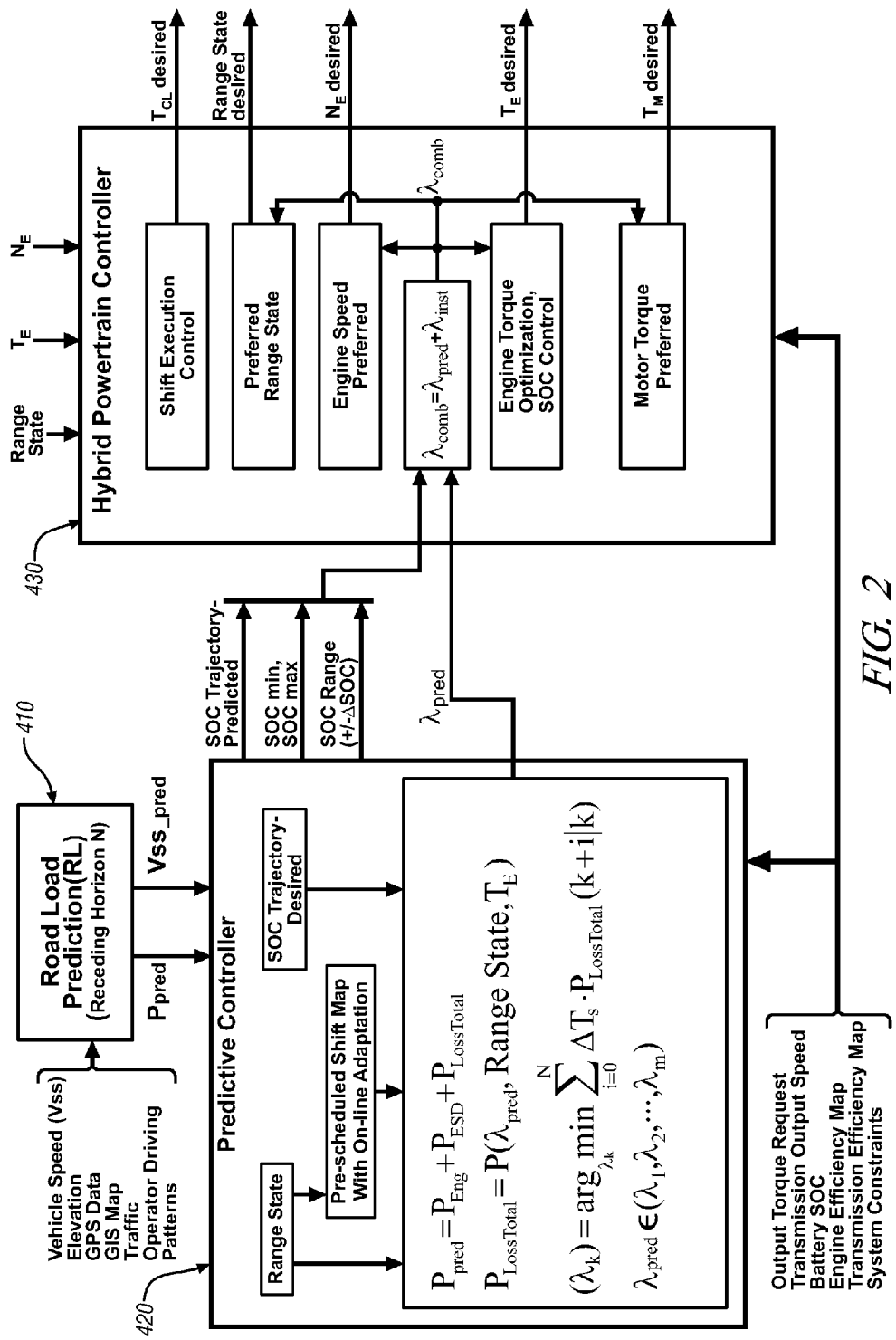
FIG. 2 is a schematic diagram of an exemplary architecture for a control system of the exemplary hybrid powertrain in accordance with the present disclosure.

FIG. 2 shows elements of a predictive energy management control scheme for controlling a hybrid powertrain system for a vehicle, e.g., the hybrid powertrain system 200 for the vehicle 10 depicted in FIG. 1. The predictive energy management control scheme includes monitoring vehicle navigation including the traffic route associated with the predicted travel path for the vehicle 10, and monitoring operator driving patterns. Upcoming vehicle propulsion power requirements associated with the vehicle navigation and the operator driving patterns are iteratively predicted, preferably including predicting an impending road load that is associated with the predicted travel path taking into account the vehicle navigation and the operator driving patterns. The predictive energy management control scheme for operating the hybrid vehicle 10 includes a load prediction control scheme (Road Load Prediction) 410, a model predictive control scheme (Predictive Controller) 420, and a powertrain control scheme (Hybrid Powertrain Controller) 430.

The load prediction control scheme 410 includes monitoring states of vehicle operating parameters and external parameters including present vehicle navigation, traffic patterns, and operator driving patterns. The load prediction control scheme 410 predicts an impending road load (RL) associated with the vehicle navigation and traffic patterns corresponding to the predicted travel path for the vehicle 10. The model predictive control scheme 420 uses the vehicle propulsion power requirements associated with the impending road load to predict a fuel cost factor $\lambda_{pred}$, which governs the preferred power split ratio between the engine 240 and the torque machine(s) 230 in one embodiment. A preferred operating state for the hybrid powertrain system is determined based upon the vehicle propulsion power requirements and the preferred fuel cost factor to achieve a preferred fuel efficiency. The powertrain control scheme 430 controls operation of the hybrid powertrain system in the preferred operating state so as to be responsive to the vehicle propulsion power requirements associated with the impending road load and the predicted fuel cost factor $\lambda_{pred}$ determined using the model predictive control scheme 420. The load prediction control scheme 410, the model predictive control scheme 420, and the powertrain control scheme 430 are shown as discrete elements for ease of description. It should be appreciated that the functions described and performed by the discrete elements may be executed using one or more devices, including, e.g., algorithmic code in one or more control modules, predetermined calibrations, hardware, and/or application-specific integrated circuitry (ASIC).

One of the operating parameters of the hybrid powertrain system 200 includes a desired state-of-charge trajectory for the ESD 210 (SOC trajectory-Desired), which includes one of a charge-sustaining strategy and a charge-depleting strategy. The control scheme can predict a state-of-charge trajectory and an associated SOC range for the energy storage device corresponding to the estimated fuel cost factor associated with the predicted impending road load and the desired state-of-charge trajectory for the energy storage device.

The load prediction control scheme 410 includes monitoring states of vehicle and external parameters including present vehicle navigation, traffic patterns, and operator driving patterns. The control module 120 monitors signal inputs from the GPS/communications system 110 including any available extra-vehicle communications and on-vehicle monitoring systems to evaluate traffic patterns and predict vehicle speed. The information includes inputs from GPS devices, inertia measurement sensors, and infrared sensors and radar devices to estimate the traffic information of a defined active window in the vicinity of the vehicle.

Vehicle elevation and topographical information is determined by interpolating the on-board 3-D GIS digital map with GPS signal inputs and the predicted vehicle speed to generate a navigational trajectory. This includes the GPS system interpolating information in the 3-D GIS digital map to provide elevation information for the predicted travel path for the vehicle 10. Other information includes a present geographic location of the vehicle 10, present traffic patterns in the vicinity of the geographic location of the vehicle 10, and a present route of the vehicle 10, i.e., the direction the vehicle is traveling on a specific roadway on its present travel path. The geographic information for the present route is evaluated to determine road load effects associated with topographical changes in elevation, curves, intersections, and other roadway features.

Operator driving pattern preferably includes an average power demand, an average braking power demand, a standard deviation of driving power demand, and a ratio between vehicle stop time to the total driving time, determined using the operator interface 130. The operator driving pattern is predicted using a driving pattern recognition function based on statistical driving cycle information that can be developed during ongoing operation of the vehicle 10. This preferably includes monitoring operator driving patterns to derive statistical driving pattern information from historical driving cycle information.

The load prediction control scheme 410 iteratively and periodically predicts the impending road load associated with the vehicle navigation, the operator driving behavior, the vehicle elevation and topographical information, and the traffic patterns over a receding horizon for the predicted travel path. The impending road load preferably takes the form of a predicted output power request ($P_{pred}$) and the predicted vehicle speed ($V_{ss-pred}$). The receding horizon is an ensuing two to three minute time window of vehicle operation over which the impending road load can be predicted based upon the aforementioned inputs.

The model predictive control scheme 420 determines hybrid power management control based upon vehicle propulsion power requirements associated with the impending road load, expressed as the predicted fuel cost factor $\lambda_{pred}$. The model predictive control scheme 420 uses the vehicle propulsion power requirements associated with the impending road load and predicted vehicle driving conditions to iteratively determine the preferred power management control, including the power split ratio between the engine 240 and the torque machine(s) 230, preferably using a model predictive control framework to generate the predicted fuel cost factor $\lambda_{pred}$.

Preferred inputs to the model predictive control scheme 420 to determine the preferred power management control associated with the impending road load include a preferred trajectory for a state-of-charge of the ESD 210 (SOC Trajectory-Desired), a present vehicle speed, and the range state for the hybrid transmission 250, including execution of a pre-scheduled shift map having on-line or real-time adaptation. Other inputs include present powertrain operating states, including the output torque command, the output speed of the hybrid transmission 250, SOC of the ESD 210, an efficiency map of the engine 240 that details power loss in the engine 240 as a function of operating speed and load, an efficiency map of the hybrid transmission 210 that details power loss in the hybrid transmission 210, typically as a function of operating speed, and system constraints. The system constraints include maximum and minimum limits for torque transfer through the hybrid transmission 210 due to limits related to torque transfer clutches, power limits of the ESD 210, motor torque capacity of the torque machine(s) 230, and others. The SOC of the ESD 210 is characterized in terms of the present SOC, maximum and minimum boundary conditions for the battery state-of-charge (BAT SOC Max, BAT SOC MM) and the SOC range (+/−ΔSOC).

The range state for the hybrid transmission 250 is input to the predetermined shift map constructed with off-line optimization using predetermined driving cycles. The predetermined shift map is adapted during ongoing operation based on the actual range state that is determined and realized by the hybrid powertrain controller 430 during actual operation of the hybrid powertrain system responsive to the vehicle propulsion power requirements associated with the impending road load and the fuel cost factor.

The model predictive control scheme 420 executes iteratively to generate the predicted fuel cost factor $\lambda_{pred}$ that minimizes fuel and/or total power costs at periodic time steps over the receding horizon. The maximum and minimum boundary conditions for SOC of the ESD 210 indicate a capacity of the ESD 210 to transfer power, including charging power and discharging power. The state-of-charge trajectory for the ESD 210 is associated with one of the charge-sustaining strategy and the charge-depleting strategy. The charge-sustaining strategy includes operating the hybrid powertrain system 200 such that the SOC of the ESD 210 at the end of a trip is substantially the same as the SOC of the ESD 210 at the beginning of the trip. The SOC Range (+/−ΔSOC) can vary over the course of the trip. The charge-depleting strategy includes operating the hybrid powertrain system 200 such that the SOC of the ESD 210 at the end of a trip is at or near a predetermined SOC value that is less than the SOC of the ESD 210 at the beginning of the trip. In one embodiment, the maximum and minimum boundary conditions and the SOC Range (+/−ΔSOC) are substantially static boundaries that do not vary over time. In one embodiment, the maximum and minimum boundary conditions include a range between 60% and 50% SOC. In another embodiment, the maximum and minimum boundary conditions are dynamic boundaries that follow the charge-depletion trajectory.

For real-time execution, the model predictive control scheme 420 is constructed as a constrained quadratic optimization problem to minimize computation load of the constrained nonlinear optimization problem.

The model predictive control scheme 420 assumes that the predicted output power request ($P_{pred}$) responsive to the output torque command is achieved by generating power with the engine 240 ($P_{Eng}$) and the torque machine(s) 230 using stored power from the ESD 210 ($P_{ESD}$) to transmit tractive power to the driveline 300. The total power consumption includes a corresponding total system power loss ($P_{LossTotal}$):

$$P_{Pred} = P_{Eng} + P_{ESD} + P_{LossTotal} \qquad [1]$$

The minimum total system power loss ($P_{LossTotal}$) is determined as follows. The vehicle and powertrain are represented as power-based quasi-static mathematical models that are sufficiently accurate to model all desired system properties while enabling real-time calculation. The total system power loss ($P_{LossTotal}$) is determined as a combination of power losses from elements of the hybrid powertrain as follows:

$$P_{LossTotal} = \lambda \cdot P_{LossEng} + P_{LossESD} + P_{LossMech} + P_{LossMot} \qquad [2]$$

wherein λ is a fuel cost factor.

The power loss through the engine 240 ($P_{LossEng}$) is determined as follows:

$$P_{LossEng} = \alpha_2(N_E) \cdot P_{Eng}^2 + \alpha_1(N_E) \cdot P_{Eng} + \alpha_0(N_E) \qquad [3]$$

wherein $\alpha_2$, $\alpha_1$, and $\alpha_0$ are predetermined constants and NE is the rotational speed of the engine.

The power loss through the torque machine(s) 230 ($P_{LossMng}$) is determined as follows:

$$P_{LossMot} = \gamma_2(\omega)_{Mot}^2 + \gamma_1(\omega) \cdot P_{Mot} + \gamma_0(\omega) \qquad [4]$$

wherein $\gamma_2$, $\gamma_1$, and $\gamma_0$ are predetermined constants and ω is rotational speed of the torque machine(s) 230.

The power loss through the ESD 210 ($P_{LossESD}$) is determined as follows:

$$P_{LossESD} = \beta_2(SOC, Temp) \cdot P_{ESD}^2 \qquad [5]$$

wherein $\beta_2$ is a predetermined constant, Temp is a temperature of the ESD 210 and SOC is the present state-of-charge of the ESD 210.

The mechanical power loss of the hybrid transmission 250 ($P_{MechLoss}$) is as follows:

$$P_{MechLoss} = aN_I + bN_I^2 + cN_I N_O + dN_O^2 \qquad [6]$$

wherein $N_I$ is the rotational speed of an input shaft to the hybrid transmission 250 through which power is transferred from the engine 240, and $N_O$ is rotational speed of the output member 64 of the hybrid transmission 250. Although $N_I$ and $N_E$ may differ due to a damper placed between the engine 240 and the transmission input shaft, $N_I$ and $N_E$ are considered equal at steady state as follows.

$$N_E = N_I \qquad [7]$$

The motor speed ω, transmission input speed $N_I$ and transmission output speed $N_O$ have the kinematical relationship as follows:

$$\omega = [s_1 \quad s_2] \cdot \begin{bmatrix} N_I \\ N_O \end{bmatrix} \qquad [8]$$

wherein $s_1$ and $s_2$ are predetermined constants.

The nonlinear component models are approximated as quadratic relations between incoming and outgoing power and that is reduced to a single equation of aggregated total system power loss ($P_{LossTotal}$) as follows.

$$P_{LossTotal} = P(\lambda_{pred}, \text{Range State}, T_E) \qquad [9]$$

Thus, the aggregated total system power loss $P_{LossTotal}$ becomes a quadratic cost function with higher order terms omitted, with $\lambda_{red}$ as the predicted fuel cost factor, Range State as the range state of the hybrid transmission 250, $T_E$ as the input torque from the engine 240 to the hybrid transmission 250, over a time period N of the receding horizon. The fuel cost factor λ is assumed a constant through the time period N of the receding horizon.

Consequently, the nonlinear optimization problem can be reduced to a constrained quadratic optimization problem which achieves a global minimum value for aggregated total system power loss ($P_{LossTotal}$). Preferred values for the predicted fuel cost factor $\lambda_{pred}$ and the range state of the hybrid transmission 250 can be determined, and $T_E$ is the input torque from the engine 240 that can be determined in a relatively short computation time.

Overall, the quadratic optimization problem predicts the fuel cost factor λ that results in a minimum power loss for the predicted road load within the receding horizon N and to dynamically determine the SOC boundary within the receding horizon N. The fuel cost factor λ preferably includes one of a plurality of preset values as follows:

$$\lambda_k \in (\lambda_1, \lambda_2, \ldots, \lambda_m) \qquad [10]$$

wherein $\lambda_1, \lambda_2, \lambda_m$ include numerals ranging between 0 and 1.

When it is assumed that the fuel cost factor λ is constant throughout each time period N of the receding horizon with predetermined discrete values, the online optimization problem reduces to selecting the predicted fuel cost factor $\lambda_{pred}$ as the preset value for $\lambda_k$ that achieves a minimum predicted power loss over the receding horizon N for sampling time $\Delta T_s$ as follows.

$$(\lambda_k) = \underset{\lambda_k}{\operatorname{argmin}} \sum_{i=0}^{N} \Delta T_s \cdot P_{LossTotal}(k+i \mid k) \qquad [11]$$

The transmission range state is predetermined with the pre-scheduled shift map including on-line adaptation, and the model predictive control scheme 420 executes at a relatively slow rate, e.g., a 1 second loop time. The preset value for $\lambda_k$ that achieves the minimum predicted power loss over the receding horizon N is denoted as the predicted fuel cost facto $\lambda_{pred}$ for use with the powertrain control scheme 430.

The powertrain control scheme 430 controls operation of the hybrid powertrain system in the preferred operating state to generate torque and speed outputs to the driveline 300 that are responsive to the vehicle propulsion power requirements associated with the impending road load and the predicted fuel cost factor $\lambda_{pred}$, taking into account the present SOC and an SOC range. The SOC range is defined by the static or dynamic maximum and minimum boundary conditions for the SOC.

The model predictive control scheme 420 communicates the control variables including the predicted fuel cost factor $\lambda_{pred}$ and the predicted SOC trajectory for the ESD 210 to the powertrain control scheme 430. Other inputs include the maximum and minimum boundary conditions for SOC associated with the predicted SOC trajectory and the SOC Range (SOC Range (+/−ΔSOC)), the maximum and minimum boundary conditions for the battery state-of-charge (BAT SOC Max, BAT SOC Min), and the present SOC of the ESD 210. Other inputs include engine operation including engine speed ($N_E$) and engine output power, e.g., in terms of engine torque ($T_E$). Other inputs include the present operating range state (Range State) of the hybrid transmission 200. Other inputs include present powertrain operating states, including the output torque command, the output speed of the hybrid transmission 250, an efficiency map of the engine 240 that details power loss in the engine 240 as a function of operating speed and load, an efficiency map of the hybrid transmission 210 that details power loss in the hybrid transmission 210, typically as a function of operating speed, and system constraints. The system constraints include maximum and minimum limits for torque transfer through the hybrid transmission 210 due to limits related to torque transfer clutches, power limits of the ESD 210, motor torque capacity of the torque machine(s) 230, and others. The powertrain control scheme 430 determines preferred operating points for the engine 240 and torque machine(s) 230, limited by the aforementioned system constraints and present powertrain operating states.

The powertrain control scheme 430 acts to stabilize dynamic behavior between the engine 240 and the torque machine(s) 230. This includes an SOC control function that uses a target SOC determined from the predicted SOC trajectory for the ESD 210 and the maximum and minimum boundary conditions for SOC associated with the predicted SOC trajectory (SOC Range (+/−ΔSOC)) from the model predictive control scheme 420 to determine an instantaneous fuel cost factor $\lambda_{inst}$. This is shown with reference to FIG. 3. A combined fuel cost factor $\lambda_{comb}$ is determined based upon the predicted and instantaneous fuel cost factors $\lambda_{pred}$ and $\lambda_{inst}$ as follows.

$$\lambda_{comb}=\lambda_{pred}+\lambda_{inst} \quad [12]$$

The combined fuel cost factor $\lambda_{comb}$ can be used by a strategic optimization function to determine a preferred transmission range state and engine speed in real time. The combined fuel cost factor $\lambda_{comb}$ is used to dynamically decide to apply an alternate engine operating state, including a cylinder deactivation operating state and a fuel cutoff state. A preferred torque split between the engine 240 and the torque machine(s) 230 can also be determined.

The powertrain system 200 can include an external power source that can be used to charge the ESD 210, e.g., when the vehicle 10 is static, as when parked for a period of time. The control module 120 can include operating strategies that encompass a charge-depletion strategy for the ESD 210. In this embodiment, the maximum and minimum boundary conditions are dynamic boundaries that follow a preferred charge-depletion trajectory over time. The powertrain system 200 manages power outputs from the ESD 210 and the engine 240 taking into account the charge-depletion strategy.

The powertrain control scheme 430 uses aggregate system losses ($P_{LossTotalInst}$) of the hybrid powertrain to formulate the minimal power loss optimization for instantaneous power management control which determines the preferred power split between engine and electric motor as follows:

$$P_{LossTotalInst}=\lambda_{comb} \cdot P_{LossEngInst}+P_{LossESDInst}+P_{LossMechInst}+P_{LossMotInst} \quad [13]$$

wherein $P_{LossEngInst}$, $P_{LossESDInst}$, $P_{LossMechInst}$ and $P_{LossMotInst}$ are instantaneous system power losses of the engine 240, the ESD 210, the transmission 250, and the torque machine(s) 230 that can be empirically determined.

The operating points for the engine 240 and the torque machine(s) 230 for the hybrid transmission 250 associated with the preferred engine/motor power split are identified by determining a feasible operating space for the preselected powertrain operating parameters such as input power from the engine (Ti/Ni), searching the feasible operating space for an operating point corresponding to a minimum system power loss ($P_{LossTotalInst}$) in real time operation. Because of the inclusion of the combined fuel cost factor $\lambda_{comb}$ in formulating the constrained nonlinear optimization problem, the searching for a minimum system power loss is adapted to bias the selection as a function of parameters associated with utilization and electric current throughput associated with repetitive charge/discharge cycles of the ESD 210.

The powertrain control scheme 430 for controlling the hybrid powertrain system 200 includes three layers of instantaneous optimization to determine the preferred operating points of the hybrid powertrain 200. A first layer executes to determine hybrid range state and engine speed, a second layer executes to determine engine torque and engine operational state, and a third layer executes to determine motor torques. These operation points will then be realized through the coordinated control of the engine 240, transmission 250 and torque machine(s) 230. This includes determining the constraint operating space and the present transmission range state during each iteration to determine a preferred engine speed ($N_E$ desired), a preferred input torque ($T_E$ desired) from the engine 240 to the transmission 250, a preferred range state (Range State desired) for the hybrid transmission 250 including any changes to clutch torques ($T_{CL}$ desired) associated with shift executions, and preferred motor torque(s) ($T_M$ desired) output from the torque machine(s) 230.

The operation of the hybrid powertrain system 200 is controlled responsive to the output torque command including the operator torque request and the predicted state-of-charge trajectory for the ESD 210. Preferred operating states for the hybrid powertrain system 200 including engine states and hybrid transmission range states can be determined based upon the predicted upcoming power requirements and the preferred power management control for vehicle propulsion. The engine states include engine ON and OFF states, all-cylinder and cylinder deactivation states, and fueled and fuel cutoff states. Transmission range states include continuously variable modes and fixed gear range states.

FIGS. 4A through 4D graphically show maximum and minimum boundaries for battery state-of-charge (BAT SOC Max, BAT SOC Min), the predicted output power request $P_{pred}$ associated with the impending road load (RL), the predicted fuel cost factor $\lambda_{pred}$, the predicted SOC trajectory, and the SOC range (+/−ΔSOC) plotted against a receding horizon in accordance with the control schemes described herein. The desired SOC trajectory is preferably predetermined, including a boundary including an allowable range of operation for the SOC (+/−ΔSOC) around the desired SOC trajectory. The dynamically determined SOC boundary is set based upon the allowable range of operation for the SOC (+/−ΔSOC) relative to the predicted SOC trajectory.

The desired SOC trajectory includes an idealized time-rate change in the SOC of the ESD 210 associated with operation of the vehicle 10. For a vehicle employing a hybrid powertrain system operating in a charge-sustaining mode, the desired SOC trajectory is intended to control the SOC of the ESD 210 such that the SOC at the end of a trip is substantially equal to the original SOC value occurring at the start of the trip. For a vehicle employing a hybrid powertrain system operating in a charge-depleting mode, the desired SOC trajectory is intended to control the SOC of the ESD 210 such that the SOC of the ESD 210 at the end of a trip achieves a target minimum SOC value to minimize on-board fuel consumption. An exemplary desired SOC trajectory in a charge-depleting operation is a linear connection between an initial SOC and the target minimum SOC.

The impending road load (RL) is iteratively and periodically predicted using the load prediction control scheme 410. The predicted fuel cost factor ($\lambda_{pred}$) anticipates and is inversely proportional to the impending road load (RL). The predicted fuel cost factor is used to determine the predicted SOC trajectory with a direct relationship. Thus, an increase in the predicted fuel cost factor increases the predicted SOC trajectory, permitting a more aggressive immediate discharging rate of the ESD 210, and a decrease in the predicted fuel cost factor decreases the predicted SOC trajectory, restricting an immediate discharging rate of the ESC 210.

The model predictive control scheme 420 executes to determine the dynamic SOC operating range in accordance with the fuel cost factor $\lambda_{pred}$, as described with reference to FIG. 2. The SOC is controlled within the dynamically determined SOC boundary (+/−ΔSOC) around the predicted SOC trajectory corresponding to the predicted fuel cost factor $\lambda_{pred}$. The predicted fuel cost factor $\lambda_{pred}$ and the dynamically determined SOC boundary are used by the SOC control scheme in hybrid powertrain controller 430 to determined the instantaneous fuel cost factor $\lambda_{inst}$.

The fuel cost factor $\lambda_{pred}$ and the dynamically determined SOC boundary are sent from the predictive controller 420 and fed through the hybrid controller 430 to stabilize the dynamic behavior between the engine 240, the torque machine(s) 230, and the ESD 210, and to determine the preferred engine torque/speed and motor torque/speed inside the constraint operating space to maximize system efficiency and performance. These constraints, including available engine torque, available electric motor torque, available battery power and available hydraulic clutch capacity, are enforced dynamically at every time step by the powertrain control scheme 430.

Figure 3:
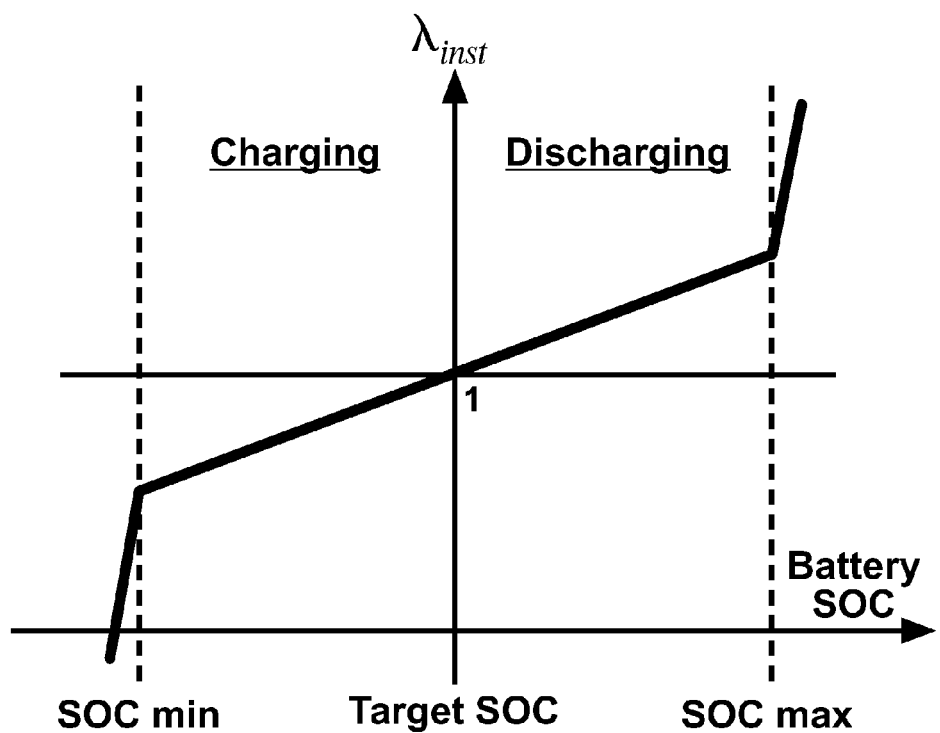
FIG. 3 is a graphical depiction of a preferred fuel cost factor plotted in relation to a state-of-charge of an energy storage device in accordance with the present disclosure.

FIG. 3 shows an exemplary SOC calibration executed in the powertrain control scheme 430 to determine the instantaneous fuel cost factor $\lambda_{inst}$. When the present SOC is greater than the target SOC, the instantaneous fuel cost factor $\lambda_{inst}$ increases as SOC increases; when the present SOC is less than the target SOC, the instantaneous fuel cost factor $\lambda_{inst}$ decreases as SOC decreases. The maximum and minimum states of charge (SOC max and SOC min) are dynamically determined in the model predictive control scheme 420, associated with the preferred fuel cost factor $\lambda_{pred}$. When SOC is greater than the maximum SOC or less than the minimum SOC, the instantaneous fuel cost factor $\lambda_{inst}$ increases or decreases at accelerated rates.

Figure 4A:
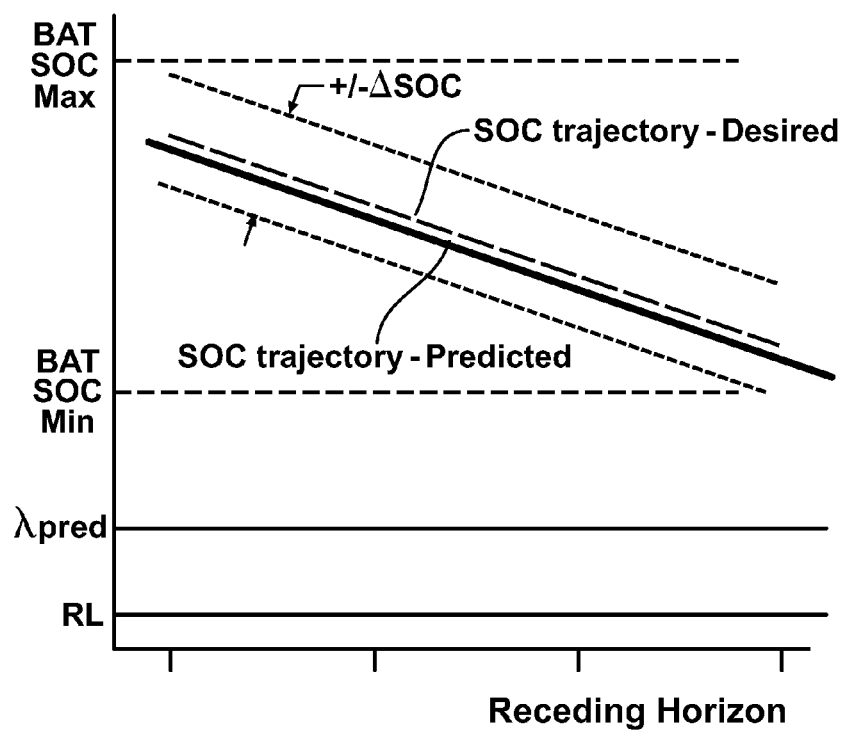
FIGS. 4A-4D are graphical depictions of operating a control scheme in a hybrid powertrain system in accordance with the present disclosure.

FIG. 4A shows operation whereat the predicted impending road load (RL) is unchanging. The associated predicted fuel cost factor $\lambda_{pred}$ remains unchanged, and the dynamically determined SOC boundary (+/−ΔSOC) is set, and the predicted SOC trajectory tracks the desired SOC trajectory.

Figure 4B:
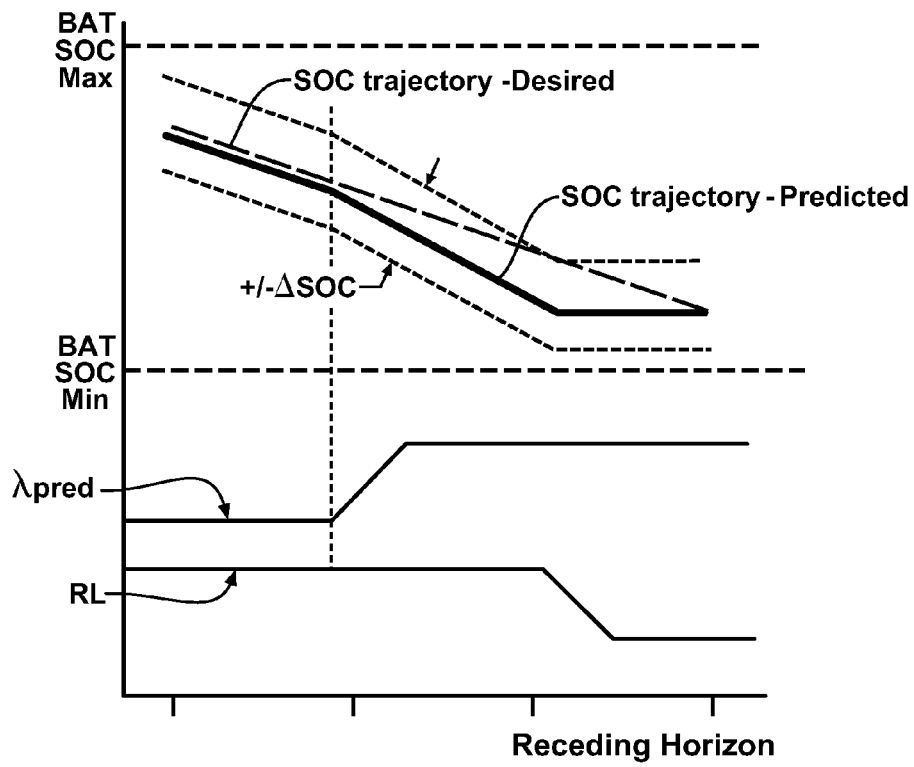

FIG. 4B shows operation whereat the predicted impending road load (RL) decreases at a future point. The associated predicted fuel cost factor $\lambda_{pred}$ correspondingly increases in anticipation of the decreased impending road load, reducing the dynamically determined SOC boundary (+/−ΔSOC). The predicted SOC trajectory can initially decrease at an accelerated rate relative to the desired SOC trajectory, and subsequently regain SOC beginning at the point at which the actual road load decreases. The SOC is regained by management of the powertrain system, including using fuel cutoff operation and regenerative braking and other control schemes to recharge of the ESD 210 at the end of the receding horizon.

Figure 4C:
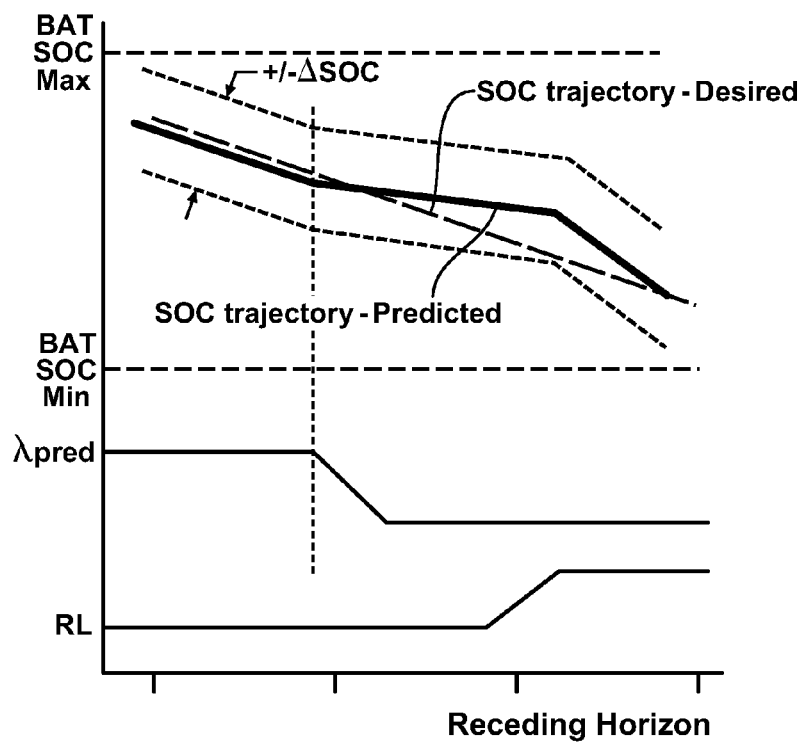

FIG. 4C shows operation whereat the predicted impending road load (RL) increases at a future point. The associated predicted fuel cost factor $\lambda_{pred}$ correspondingly decreases in anticipation of the decreased impending road load, increasing the dynamically determined SOC boundary (+/−ΔSOC). The predicted SOC trajectory can initially increase at a decelerated rate relative to the desired SOC trajectory, and subsequently decrease SOC beginning at the point at which the actual road load increases. The SOC decreases by management of the powertrain system, including generating tractive torque using the torque machine(s) 230 during the increased road load at the end of the receding horizon.

Figure 4D:
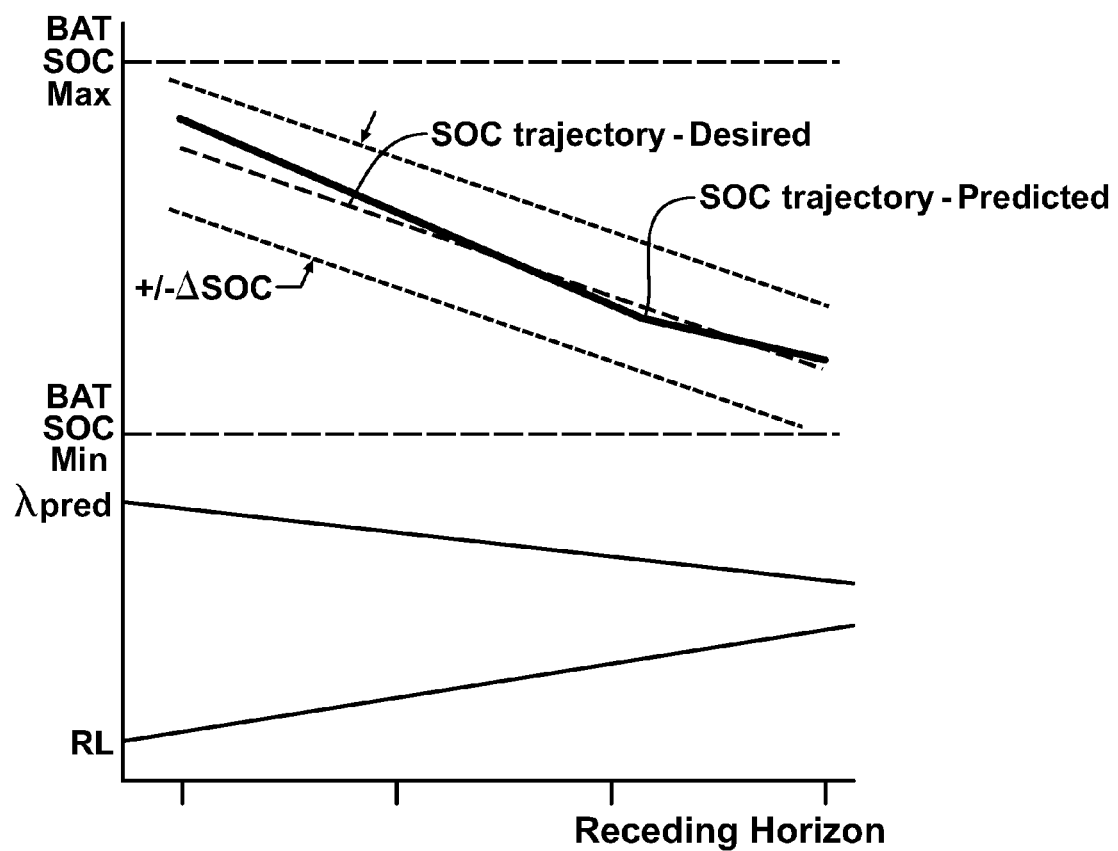

FIG. 4D shows operation whereat the predicted impending road load (RL) is monotonically increasing. The associated predicted fuel cost factor $\lambda$pred correspondingly monotonically decreases with the increased impending road load, increasing the dynamically determined SOC boundary (+/−ΔSOC). The predicted SOC trajectory remains relatively close to the desired trajectory.

The predictive energy management control scheme uses the vehicle route, the impending road load, and the statistical driving pattern information in the receding horizon control problem to predict vehicle driving conditions for an immediately upcoming limited time period, e.g., over the next several minutes of vehicle operation. The predicted vehicle driving conditions can be used to predict and adjust vehicle power requirements based upon the predicted vehicle driving conditions for the limited time period. The predicted vehicle driving conditions for the limited time period can be used to iteratively predict upcoming power requirements for vehicle propulsion, preferably using a predictive energy management strategy in a model predictive control framework.

It is understood that modifications are allowable within the scope of the disclosure. The disclosure has been described with specific reference to the preferred embodiments and modifications thereto. Further modifications and alterations may occur to others upon reading and understanding the specification. It is intended to include all such modifications and alterations insofar as they come within the scope of the disclosure.

The invention claimed is:

1. Method for operating a vehicle including a hybrid powertrain system comprising an internal combustion engine operatively coupled to an input member of a hybrid transmission including a torque machine operative to exchange power with an energy storage device, the hybrid transmission configured to transfer torque among the input member, the torque machine and an output member, the method comprising:
    monitoring vehicle navigation and traffic patterns associated with a predicted travel path for the vehicle;
    periodically predicting an impending road load associated with the vehicle navigation and traffic patterns;
    estimating vehicle propulsion power associated with the predicted impending road load;
    determining a desired state-of-charge trajectory for the energy storage device;

predicting a state-of-charge trajectory for the energy storage device corresponding to the estimated vehicle propulsion power and the desired state-of-charge trajectory for the energy storage device; and controlling with a control module operation of the hybrid powertrain system in response to the predicted state-of-charge trajectory for the energy storage device comprising determining a preferred power split between a power output from the engine and a power output from the torque machine, the preferred power split based upon the state-of-charge trajectory for the energy storage device.

2. The method of claim 1, further comprising:
determining boundary conditions associated with the predicted state-of-charge trajectory for the energy storage device; and
controlling operation of the hybrid powertrain system in response to a commanded output torque and the boundary conditions associated with the predicted state-of-charge trajectory for the energy storage device.

3. The method of claim 1, further comprising executing a load prediction control scheme to predict the impending road load associated with the vehicle navigation and traffic patterns to estimate the vehicle propulsion associated with the predicted travel path for the vehicle.

4. The method of claim 3, further comprising executing a predictive control scheme comprising a receding horizon control scheme to predict the impending road load associated with the vehicle navigation and traffic patterns.

5. The method of claim 4, further comprising:
optimizing a fuel cost factor associated with the impending road load; and
dynamically adjusting the predicted state-of-charge trajectory for the energy storage device based upon the optimized fuel cost factor.

6. The method of claim 4, wherein optimizing the fuel cost factor minimizes at least one of fuel cost and total power cost over the receding horizon.

7. The method of claim 6, wherein the model predictive control scheme comprises a power-based quasi-static model of total hybrid powertrain losses.

8. The method of claim 1, wherein the desired state-of-charge trajectory comprises a charge-depletion trajectory.

9. The method of claim 1, wherein the desired state-of-charge trajectory comprises a charge-sustaining trajectory.

10. Method for operating a vehicle including a hybrid powertrain system comprising an internal combustion engine operatively coupled to an input member of a hybrid transmission including a torque machine operative to exchange power with an energy storage device, the hybrid transmission configured to transfer torque among the input member and the torque machine and an output member, the method comprising:
monitoring vehicle navigation, traffic patterns, and operator driving patterns associated with a predicted travel path for the vehicle;
monitoring an operator torque request associated with operator inputs to an operator interface for the vehicle;
periodically predicting an impending road load associated with the vehicle navigation, traffic patterns, operator driving patterns, and the operator torque request;
estimating vehicle propulsion power associated with the predicted impending road load;
determining a desired state-of-charge trajectory for the energy storage device;
predicting a state-of-charge trajectory for the energy storage device corresponding to the estimated vehicle propulsion power and the desired state-of-charge trajectory for the energy storage device; and
controlling with a control module operation of the hybrid powertrain system in response to the predicted state-of-charge trajectory for the energy storage device and the operator torque request comprising determining a preferred power split between a power output from the engine and a power output from the torque machine, the preferred power split based upon the state-of-charge trajectory for the energy storage device.

11. The method of claim 10, further comprising:
estimating a predictive fuel cost factor associated with the estimated vehicle propulsion power; and
determining the preferred power split between the power output from the engine and the power output from the torque machine associated with the predictive fuel cost factor.

12. The method of claim 11, further comprising:
determining an instantaneous fuel cost factor associated with the preferred power split between the power output from the engine and the power output from the torque machine; and
wherein determining the preferred power split between the power output from the engine and the power output from the torque machine is further associated with the instantaneous fuel cost factor.

13. Method for operating a vehicle including a hybrid powertrain system, comprising:
predicting a travel path for the vehicle;
monitoring vehicle navigation and traffic patterns associated with the predicted travel path;
periodically predicting an impending road load associated with the vehicle navigation and traffic patterns associated with the predicted travel path;
estimating vehicle propulsion power associated with the predicted impending road load;
determining a desired state-of-charge trajectory for an energy storage device configured to supply power for vehicle propulsion;
predicting a state-of-charge trajectory for the energy storage device corresponding to the estimated vehicle propulsion power and the desired state-of-charge trajectory for the energy storage device; and
controlling with a control module operation of the hybrid powertrain system in response to the predicted state-of-charge trajectory for the energy storage device comprising determining a preferred power split between a power output from the engine and a power output from the torque machine, the preferred power split based upon the state-of-charge trajectory for the energy storage device.

14. The method of claim 13, further comprising:
determining boundary conditions associated with the predicted state-of-charge trajectory for the energy storage device; and
controlling operation of the hybrid powertrain system in response to a commanded output torque, the predicted state-of-charge trajectory and the boundary conditions associated with the predicted state-of-charge trajectory for the energy storage device.

15. The method of claim 13, further comprising executing a load prediction control scheme to predict the impending road load associated with the vehicle navigation and traffic patterns to estimate the vehicle propulsion associated with the predicted travel path for the vehicle.

16. The method of claim 15, further comprising executing a model predictive control scheme comprising a receding horizon control scheme to predict the impending road load associated with the vehicle navigation and traffic patterns.

17. The method of claim 16, further comprising:
   optimizing a fuel cost factor associated with the impending road load; and
   dynamically adjusting the predicted state-of-charge trajectory for the energy storage device based upon the optimized fuel cost factor.

18. The method of claim 13, wherein the desired state-of-charge trajectory comprises a charge-depletion trajectory.

19. The method of claim 13, wherein the desired state-of-charge trajectory comprises a charge-sustaining trajectory.

* * * * *